F. B. VORACEH.
FLYING MACHINE.
APPLICATION FILED AUG. 12, 1918.
1,327,125.
Patented Jan. 6, 1920.
3 SHEETS—SHEET 3.
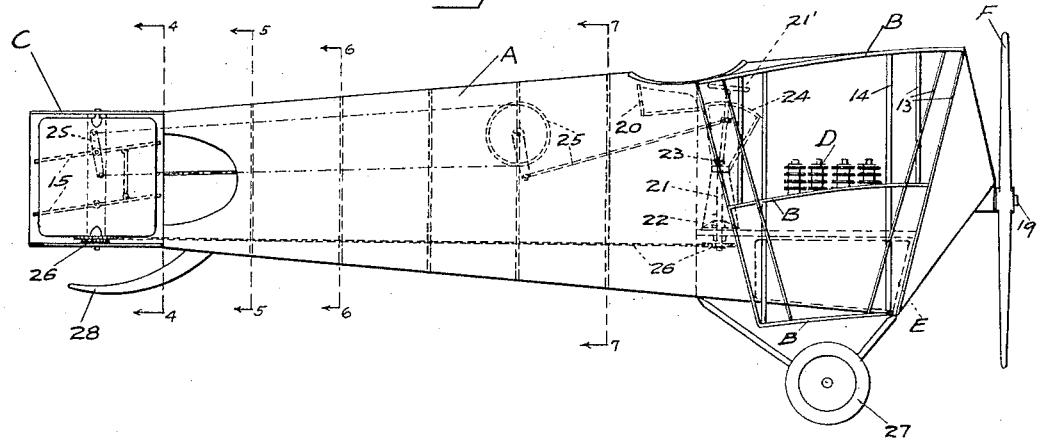
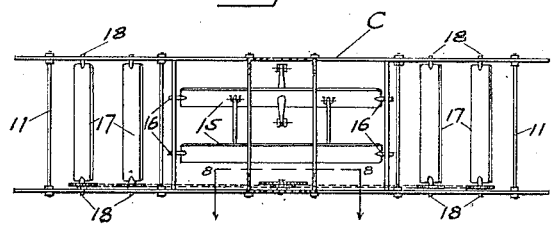
 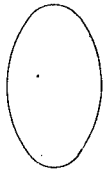 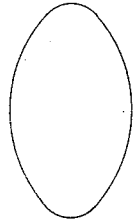
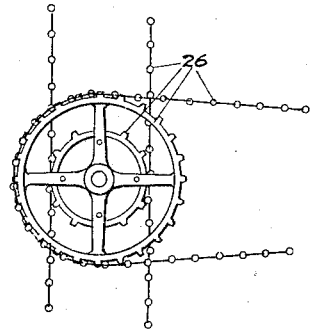
Frank B. Voraceh,
Inventor,
By R. C. Wright
Atty.

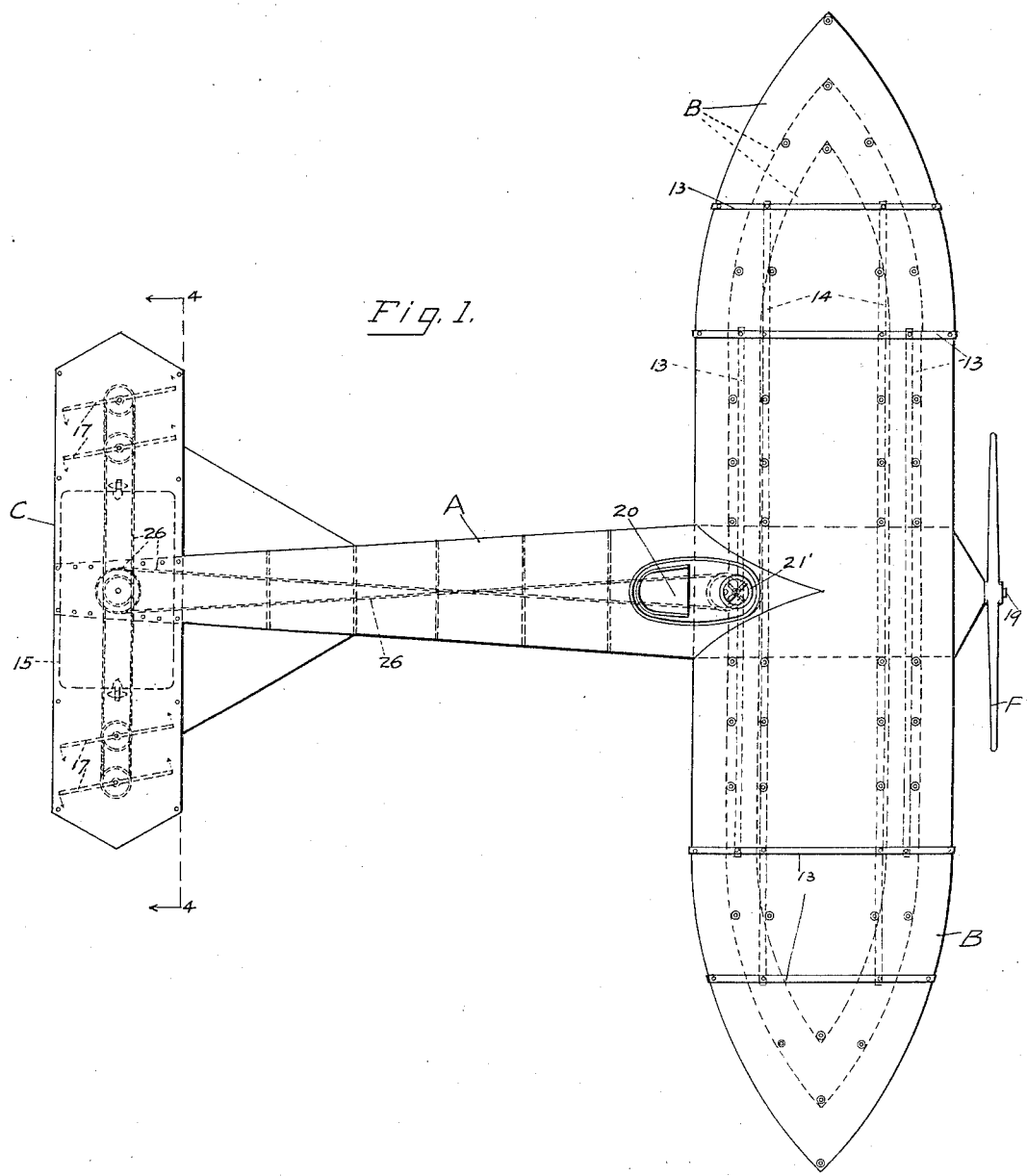

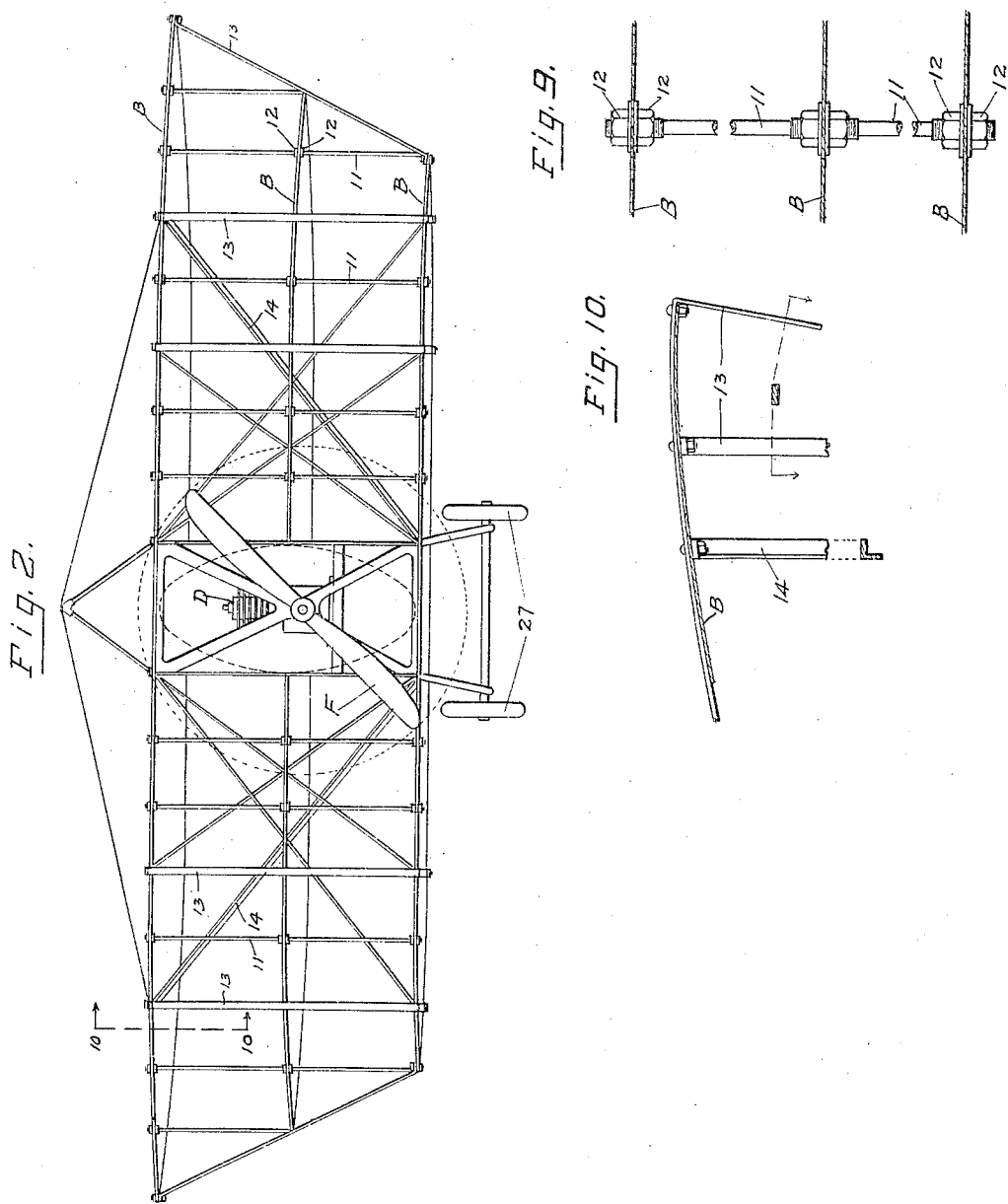

UNITED STATES PATENT OFFICE.

FRANK B. VORACEH, OF TILLAMOOK, OREGON.

FLYING-MACHINE.

1,327,125.   Specification of Letters Patent.   Patented Jan. 6, 1920.

Application filed August 12, 1918. Serial No. 249,447.

*To all whom it may concern:*

Be it known that I, FRANK B. VORACEH, a citizen of the United States, residing in the city of Tillamook, county of Tillamook and State of Oregon, have invented new and useful Improvements in Flying-Machines, of which the following is a specification, reference being had to the accompanying drawings.

My invention relates to the now common class of machines used in flying or transporting in and through the air.

The objects of my invention are to provide a device wherein the form and arrangement of the planes and rudder are new, also wherein there is a novel shape of the body and arrangement of the bracing. These objects, as well as others, I attain by the construction, combination and arrangement of parts illustrated in the accompanying drawings which form a part hereof.

Figure 1 is a plan view of the device.

Fig. 2 is a front elevation.

Fig. 3 is a side elevation.

Fig. 4 is a sectional view on the line 4—4 of Fig. 1 and the line 4—4 of Fig. 3.

Fig. 5 is a diagrammatic view on the line 5—5 of Fig. 3.

Fig. 6 is a similar view on the line 6—6.

Fig. 7 is a like view on the line 7—7.

Fig. 8 is a sectional view on the line 8—8 of Fig. 4.

Fig. 9 is a detail view of rods upon which the planes are secured at a distance from each other.

Fig. 10 is a side view of part of the forward end of the machine showing flat brace bars.

Like letters or numerals refer to like parts in all views.

An elliptical body A is provided, the same having a boat or fish like form, as indicated by the diagrammatic sectional outlines in Figs. 7—6—5.

A series of forward transverse, horizontal planes B of thin sheet steel are provided, and are of lengths increasing from the lowest to the uppermost one and all are tapered at each end. These planes are secured at a suitable distance from each other upon vertical supporting rods 11 threaded at convenient places. The planes are rigidly secured on the rods by nuts 12 above and below the planes. Diagonal and vertical brace rods 13 are arranged between and secured to the uppermost and lowest planes in desired locations. They are shown of flat construction but all angle metal may be used instead, as indicated by the single bar 14 exception, shown as part of the construction in Figs. 2 and 10.

At the tail end of the device is an integral rudder frame C, the planes thereof being tapered at each end. Within the frame C, in the center thereof, horizontally disposed rudders 15 are pivoted at their ends by pivots 16 in a manner to permit of a vertical deflection of the rudder sides. In each end of the frame C, vertically disposed rudders 17 are pivoted at their ends on pivots 18 in a manner to permit their pivotal movement in relation to the longitudinal direction of the body A.

A motor D, with fuel tank E, are secured in the forward part of the machine. A propeller F is secured upon the motor shaft 19. In the forward part of the body an operator's seat 20 is secured. Before the seat is arranged a steering rod 21 in a bearing 22 near its lower end. The rod 21 has a hand wheel 21' and a ball joint 23 near its center. The upper part of the rod 21 is movable within and in engagement with a quadrant 24. Intervening operating mechanism 25 is provided from the upper part of the rod 21 to the rudders 15, and intervening operating mechanism 26 from the lower end of the rod 21 to the rudders 17, is also provided.

Ground carriage wheels 27 are rotatably mounted below the forward end of the machine. Below the tail end is also a support 28.

It will now be seen that when the device is propelled through the air the rudders 15 are moved to a diagonal position with respect to the central plane of the body and thus cause a vertical deflection of the tail and a change of course for the machine upward or downward as desired. I contend that a body formed on the most practical lines of ship or boat construction, with a view to securing the greatest speed in such craft, is the most practical for aeroplanes. It is this principle which I have particularly sought to develop and embody in my device. It is also apparent that when, during a flight, the rudders 17 are moved to a diagonal position with respect to the longitudinal center of the body, the tail is deflected to the right or left and the course of the machine is changed to the opposite direction from that in which the tail moves. It will be observed that the chain of the mechanism 26 is crossed, which is merely to obviate the necessity of turning the wheel in an opposite direction to that in which the movement is desired.

I intend that the entire construction of the machine shall be of steel or metal, as a safeguard against fire and also for great structural strength. I maintain that this is practicable in the form I have invented, and without a great difference in weight over that of common type machines of like size and power. The all metal construction can be used in a machine arranged like mine with tapered planes and rudder frame, and with planes varying in dimensions. It is by this means that I reduce the metal weight, and at the same time produce a machine of practicable operativeness differing from those in prior use. Among the new and useful features of my device I will mention some. The tapered planes and rudder frame, the horizontal and vertical rudders combined, a body having an elliptical form producing a boat or fish shape below, the safety braces arranged vertically and diagonally in connection with the planes, which I have found to be especially advantageous in the guiding and control of the machine. While it is of course possible to use canvas for planes, the sheet metal is advantageous for reasons given. Wood may also be partly substituted but with not so good results.

Having described my invention I claim—

1. In a flying machine, the combination of three transverse, horizontal lifting planes of all metal construction, tapering at each end thereof to a point, said planes decreasing in length from the highest to the lowest, and vertical, metal rods positioned to support and secure said planes to each other and to the fuselage in pre-determined positions related to each other and to the fuselage, substantially as described.

2. In a flying machine having three transverse, horizontal lifting planes of all metal construction, tapering at each end to a point, said planes decreasing in length from the highest to the lowest, diagonal and vertical, metal bracing rods arranged between and secured to the uppermost and lowest of said planes in desired positions, in combination with said planes, substantially as described.

FRANK B. VORACEH.

Witnesses:
  GRAYCE L. BURKE,
  GEO. P. WINSLOW.